US012587230B2

(12) United States Patent
Wloczysiak

(10) Patent No.: US 12,587,230 B2
(45) Date of Patent: Mar. 24, 2026

(54) SWITCH MODULE WITH SHUNT SWITCHES

(71) Applicant: Skyworks Solutions, Inc., Irvine, CA (US)

(72) Inventor: Stephane Richard Marie Wloczysiak, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 296 days.

(21) Appl. No.: 18/133,946

(22) Filed: Apr. 12, 2023

(65) Prior Publication Data

US 2023/0336206 A1 Oct. 19, 2023

Related U.S. Application Data

(60) Provisional application No. 63/330,420, filed on Apr. 13, 2022.

(51) Int. Cl.
| | |
|---|---|
| *H04B 1/525* | (2015.01) |
| *H04B 1/00* | (2006.01) |
| *H04B 1/44* | (2006.01) |

(52) U.S. Cl.
CPC ............... *H04B 1/44* (2013.01); *H04B 1/006* (2013.01); *H04B 1/525* (2013.01)

(58) Field of Classification Search
None
See application file for complete search history.

(56) References Cited

U.S. PATENT DOCUMENTS

| | | |
|---|---|---|
| 2002/0084868 A1 | 7/2002 | Nagata et al. |
| 2002/0093383 A1 | 7/2002 | Thompson |
| 2002/0093775 A1 | 7/2002 | Beriault |
| 2007/0066245 A1 | 3/2007 | Snider |
| 2008/0007369 A1 | 1/2008 | Barber et al. |
| 2008/0079513 A1 | 4/2008 | Prikhodko et al. |
| 2008/0079514 A1 | 4/2008 | Prikhodko et al. |
| 2009/0011732 A1 | 1/2009 | Bayruns |
| 2010/0062813 A1 | 3/2010 | Kujanski et al. |
| 2011/0294443 A1 | 12/2011 | Nohra et al. |
| 2013/0037924 A1 | 2/2013 | Lee et al. |
| 2014/0300525 A1 | 10/2014 | Lee et al. |
| 2015/0003306 A1 | 1/2015 | Domino et al. |
| 2015/0304000 A1 | 10/2015 | Wloczysiak |
| 2016/0065206 A1 | 3/2016 | Ho |
| 2016/0080012 A1 | 3/2016 | Sun et al. |
| 2016/0093948 A1 | 3/2016 | Lehtola |
| 2016/0241300 A1 | 8/2016 | Penticoff et al. |
| 2016/0315591 A1 | 10/2016 | Beltran |
| 2016/0336907 A1 | 11/2016 | Gorbachov et al. |

(Continued)

*Primary Examiner* — Idowu O Osifade
(74) *Attorney, Agent, or Firm* — Knobbe, Martens, Olson & Bear, LLP

(57) ABSTRACT

A switch module is disclosed, the switch module comprising a first node; a plurality of second nodes; a plurality of series switches; a plurality of signal paths, each signal path defined between one of the plurality of second nodes and the first node and having one of the plurality of switches disposed therebetween, wherein one or more series switches are in a closed state at a time defining one or more active signal paths; and one or more shunt switches coupled between at least one of the signal paths and ground and configured to be in an open state when that signal path is one of the active signal paths.

19 Claims, 14 Drawing Sheets

(56) References Cited

U.S. PATENT DOCUMENTS

| | | | |
|---|---|---|---|
| 2017/0005693 A1 | 1/2017 | Puente et al. | |
| 2017/0063412 A1 | 3/2017 | Ripley et al. | |
| 2017/0063413 A1 | 3/2017 | Ripley et al. | |
| 2017/0141759 A1 | 5/2017 | Srirattana et al. | |
| 2017/0149390 A1 | 5/2017 | Rogers et al. | |
| 2017/0279436 A1 | 9/2017 | Domino et al. | |
| 2017/0279437 A1 | 9/2017 | Domino et al. | |
| 2017/0279483 A1 | 9/2017 | Obkircher et al. | |
| 2017/0294937 A1 | 10/2017 | Lee | |
| 2017/0346516 A1 | 11/2017 | Ripley et al. | |
| 2018/0013420 A1 | 1/2018 | Ho | |
| 2018/0054178 A1 | 2/2018 | Bergsma | |
| 2018/0152945 A1 | 5/2018 | Balteanu | |
| 2018/0262170 A1 | 9/2018 | Gorbachov et al. | |
| 2018/0331713 A1 | 11/2018 | Liu et al. | |
| 2018/0337670 A1 | 11/2018 | Zhu et al. | |
| 2018/0343001 A1 | 11/2018 | Srirattana | |
| 2019/0123707 A1 | 4/2019 | Bergsma | |
| 2019/0149102 A1 | 5/2019 | Altunkilic | |
| 2019/0149178 A1 | 5/2019 | King et al. | |
| 2019/0207586 A1 | 7/2019 | Srirattana et al. | |
| 2019/0214984 A1 | 7/2019 | Blin et al. | |
| 2019/0253087 A1 | 8/2019 | Domino et al. | |
| 2019/0319607 A1 | 10/2019 | Srirattana | |
| 2019/0334573 A1 | 10/2019 | Thompson et al. | |
| 2019/0348962 A1 | 11/2019 | Bergsma | |
| 2019/0348969 A1 | 11/2019 | Srirattana | |
| 2020/0007102 A1* | 1/2020 | Lee | H04B 7/08 |
| 2020/0007177 A1 | 1/2020 | Ripley et al. | |
| 2020/0014413 A1 | 1/2020 | Davis et al. | |
| 2020/0099255 A1 | 3/2020 | Al-shyoukh et al. | |
| 2020/0099348 A1 | 3/2020 | Gebeyehu et al. | |
| 2020/0106463 A1 | 4/2020 | Chang et al. | |
| 2020/0154434 A1 | 5/2020 | Balteanu | |
| 2020/0162114 A1 | 5/2020 | King et al. | |
| 2020/0228085 A1 | 7/2020 | Jung et al. | |
| 2020/0343933 A1* | 10/2020 | Thompson | H04B 1/005 |
| 2020/0358424 A1 | 11/2020 | Kaneda et al. | |
| 2020/0373911 A1 | 11/2020 | Wang et al. | |
| 2020/0395936 A1 | 12/2020 | Blin | |
| 2021/0028765 A1 | 1/2021 | Wang et al. | |
| 2021/0044308 A1 | 2/2021 | Domino | |
| 2021/0067139 A1 | 3/2021 | Komatsu et al. | |
| 2021/0075385 A1 | 3/2021 | Penticoff et al. | |
| 2021/0119609 A1 | 4/2021 | Kaneda et al. | |
| 2021/0126619 A1 | 4/2021 | Wang et al. | |
| 2021/0126625 A1 | 4/2021 | Wang et al. | |
| 2021/0135326 A1 | 5/2021 | Puente et al. | |
| 2021/0152208 A1 | 5/2021 | Moreschi | |
| 2021/0175913 A1 | 6/2021 | Domino | |
| 2021/0184720 A1 | 6/2021 | Thompson et al. | |
| 2022/0200571 A1 | 6/2022 | Wang et al. | |
| 2022/0209747 A1 | 6/2022 | Wang et al. | |
| 2022/0239430 A1 | 7/2022 | Jayaraman et al. | |
| 2022/0294421 A1 | 9/2022 | Wang et al. | |
| 2022/0294422 A1 | 9/2022 | Wang et al. | |
| 2022/0294423 A1 | 9/2022 | Wang et al. | |
| 2022/0345103 A1 | 10/2022 | Guo et al. | |
| 2022/0368312 A1 | 11/2022 | Wang et al. | |
| 2023/0013767 A1 | 1/2023 | Penticoff et al. | |
| 2023/0017268 A1 | 1/2023 | Domino | |
| 2023/0095556 A1 | 3/2023 | Komatsu et al. | |
| 2023/0103039 A1 | 3/2023 | Guo | |
| 2023/0105119 A1 | 4/2023 | Watanabe | |
| 2023/0107684 A1 | 4/2023 | Watanabe | |
| 2023/0147252 A1 | 5/2023 | Sun et al. | |

* cited by examiner

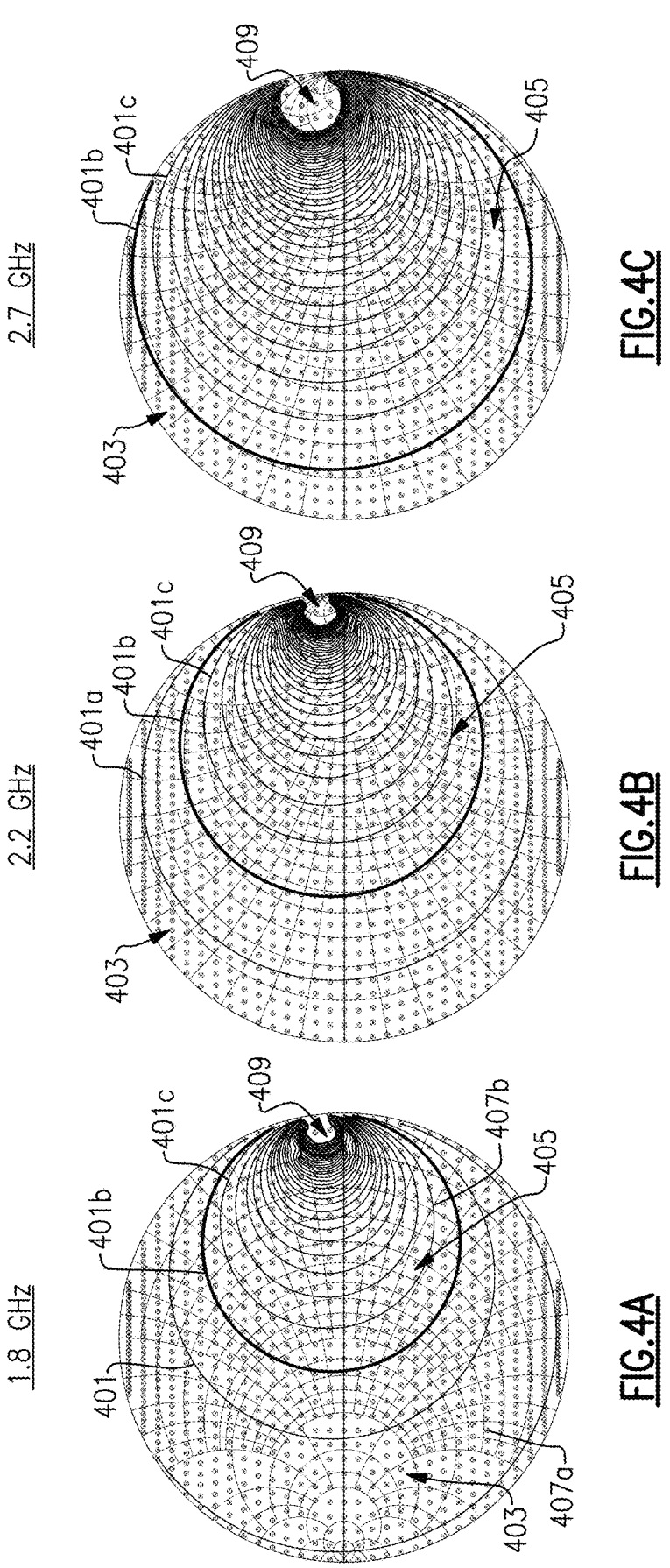

2.7 GHz 2.2 GHz 1.8 GHz

SWITCH MODULE WITH SHUNT SWITCHES

INCORPORATION BY REFERENCE TO ANY PRIORITY APPLICATIONS

Any and all applications, if any, for which a foreign or domestic priority claim is identified in the Application Data Sheet of the present application are hereby incorporated by reference under 37 CFR 1.57.

BACKGROUND

Field

Embodiments of the disclosure relate to a switch module. In particular, embodiments of the disclosure relate to a switch module, such as antenna switch module, comprising shunt arms having switches thereon to selectively connect that branch of the switch module to ground.

Description of the Related Technology

SUMMARY

According to one embodiment there is provided, a switch module comprising: a first node; a plurality of second nodes; a plurality of series switches; a plurality of signal paths, each signal path defined between one of the plurality of second nodes and the first node and having one of the plurality of switches disposed therebetween, wherein one or more series switches are in a closed state at a time defining one or more active signal paths; and one or more shunt switches coupled between at least one of the signal paths and ground and configured to be in an open state when that signal path is one of the active signal paths.

In one example, each signal path has at least one shunt switch coupled between the signal path and ground and configured to be in an open state when that same signal path is one of the active signal paths.

In one example, the switch module further comprises one or more shunt resistors connected in series with the one or more shunt switches.

In one example, the one or more shunt resistors are connected between the one or more shunt switches and ground.

In one example, the switch module further comprises one or more bypass switches connected to ground in parallel with one of the shunt resistors.

In one example, the one or more shunt resistors are variable resistors or programmable resistors.

In one example, the switch module is an antenna switch module.

In one example, switch module further comprises a plurality of bandpass filters wherein each second node is configured to be connected to a bandpass filter having an associated passband.

In one example, the one or more shunt switches connected to signal paths that are not one of the active signal paths are in a closed state and wherein at least one of the one or more shunt switches connected to the one or more active signal paths are in an open state.

In one example, for each signal path, the shunt switches that are in an open state and the shunt switches that are in a closed state when that signal path is one of the active signal paths are preset.

In one example, for each signal path, the shunt switches that are in an open state and the shunt switches that are in a closed state when the signal path is one of the active signal paths are preset based upon a determination, for each shunt switch, of whether the loss to a signal passing through one of the active signal paths is greater in the case of the shunt switch being in an open state or in a closed state.

In one example, the switch module is configured to minimize the loss to the signal passing through one of the active signal paths.

In one example, the determination is based at least in part on the passbands of the bandpass filter each second node is configured to be connected to.

In one example, switch module further comprises a plurality of bandpass filters connected to the plurality of second nodes such that each signal path comprises a bandpass filter.

According to another embodiment there is provided a radio-frequency front end module comprising a switch module, the switch module having: a first node; a plurality of second nodes; a plurality of series switches; a plurality of signal paths, each signal path defined between one of the plurality of second nodes and the first node and having one of the plurality of switches disposed therebetween, wherein one or more series switches are in a closed state at a time defining one or more active signal paths; and one or more shunt switches coupled between at least one of the signal paths and ground and configured to be in an open state when that signal path is one of the active signal paths.

In one example, the switch module is an antenna switch module.

According to another embodiment there is provided a wireless device comprising a switch module, the switch module having: a first node; a plurality of second nodes; a plurality of series switches; a plurality of signal paths, each signal path defined between one of the plurality of second nodes and the first node and having one of the plurality of switches disposed therebetween, wherein one or more series switches are in a closed state at a time defining one or more active signal paths; and one or more shunt switches coupled between at least one of the signal paths and ground and configured to be in an open state when that signal path is one of the active signal paths.

In one example, the wireless device further comprises a radio-frequency front end module, wherein the switch module is disposed within the radio-frequency front end module.

In one example, the switch module is an antenna switch module.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended to be limiting. In the figures, each identical or nearly identical component that is illustrated in various figures is represented by a like numeral. For purposes of clarity, not every component may be labeled in every figure. In the figures:

FIGS. 4A-4C illustrate the effect of shunt switches being open and closed;

DETAILED DESCRIPTION

Aspects and embodiments described herein are directed to a switch module having one or more shunt switches connected between the branches of the switch module and ground. By connecting branches of the switch module not connected to the signal path (i.e., that a radio-frequency signal is not passing through) to ground, losses can be reduced.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1B:
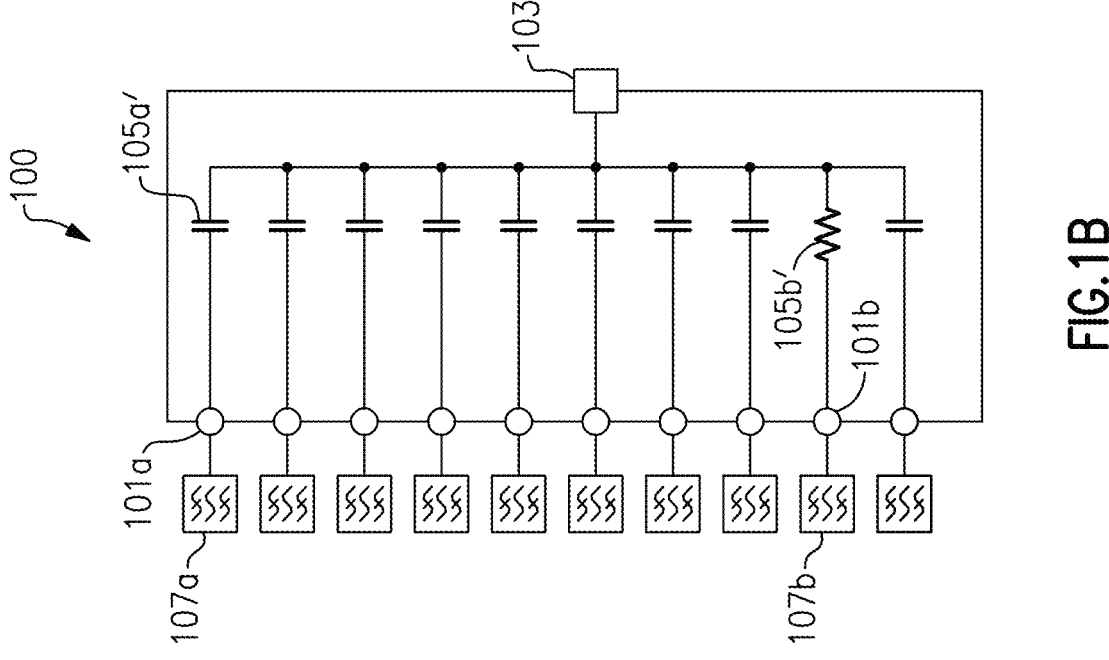
FIGS. 1A and 1B illustrate a switch module.
Figure 1A:
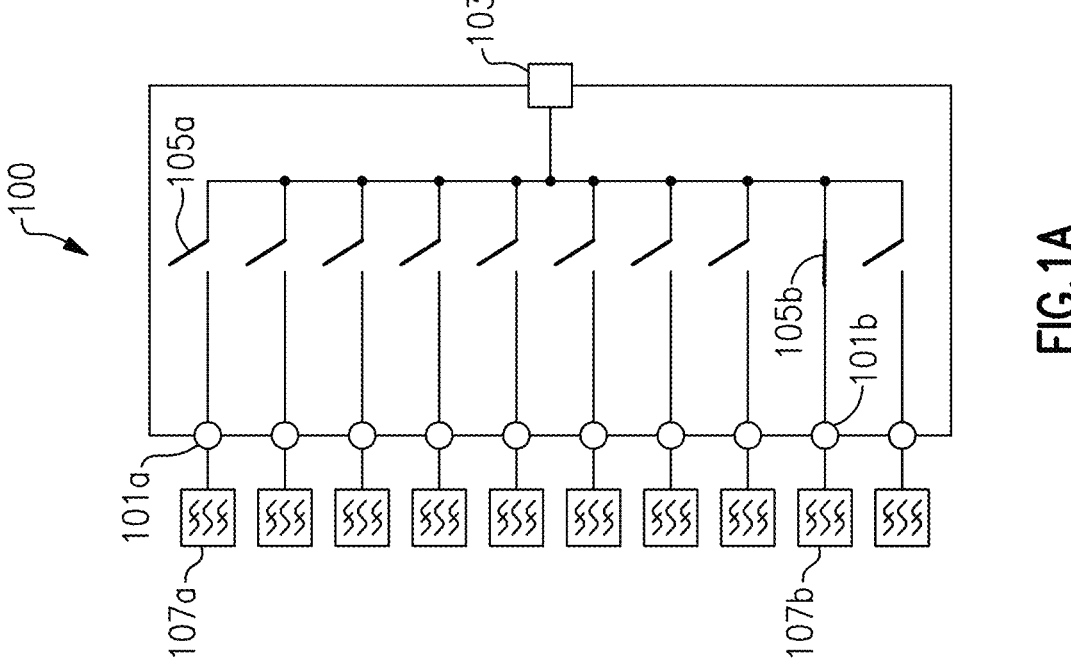

FIG. 1A illustrates a switch module 100 for connecting one of a plurality of second (e.g., input) nodes 101 to a first (e.g., output) node 103. A signal path is defined between each of the plurality of input nodes 101 and the output node 103, through which a radio-frequency signal may pass. The switch module 100 comprises a plurality of series switches 105 that allow a particular signal path to be connected. That is, the series switches 105 are connected in series between a particular input node 101 and the output node 103 and allow a particular input node 101 and the output node 103 to be connected or disconnected. For example, in FIGS. 1A, series switch 105b is in a closed state whilst the other series switches, e.g., series switch 105a, are in an open state. This serves to connected input node 101b to output node 103, whilst the other input nodes, e.g., input node 101a, are disconnected from the output node 103.

One or more of the plurality of series switches 105 is in a closed state at any given time, such that one or more of the input nodes 101 is connected to the output node 103 at any given time. The signal paths defined between the input nodes 101 and the output nodes that are connected by a series switch 105 that is in a closed state are referred to as the active signal paths, as it is these signal path along which radio-frequency signals may pass. For simplicity, the switch modules herein will be described with respect to a single active signal path, but it will be appreciated that multiple signal paths may be active, for example when a switch module is in a carrier aggregation mode. In FIG. 1A, the active signal path is defined between input node 107b and output node 103 and comprises series switch 105b.

FIG. 1B shows an alternative illustration of the switch module 100. In FIG. 1B, the series switches in an open state (e.g., series switch 105a in FIG. 1A) are shown as capacitors, e.g., capacitor 105a'. On the other hand, the series switches in a closed state (e.g., series switch 105b in FIG. 1A) are shown as resistors, e.g., resistor 105b'. Replacing the series switches 105 with the capacitors and resistors 105' represents what the open and closed switches look like electrically, to a radio-frequency signal passing through the switch module 100. Such an equivalent representation can be helpful for understanding the properties of a switch module.

In both of FIGS. 1A and 1B, a plurality of bandpass filters 107 are also shown. Each bandpass filter 107 is external to the switch module 100 and connected to an input node 101 of the switch module 100, though in some cases it is noted the bandpass filters 107 may be integral with the switch module 100 and provided between the input nodes 101 and the series switches 105. One bandpass filter 107 is provided for each input node 101. For example, bandpass filter 107a is connected to input node 101a and bandpass filter 107b is connected to input node 101b. Each bandpass filter 107 has a passband associated with it, i.e., a range of frequencies that are passed by the filter, whilst signals at frequencies outside of this range are heavily attenuated. Preferably, each bandpass filter 107 connected to the switch module 100 has a different passband, though in some cases the passbands of different bandpass filters 107 may overlap. The bandpass filters 107 mean that each signal path in the switch module 100 corresponds to a different passband, or, in other words, carries a different range of frequencies. One particular exemplary use of a switch module 100 with passband filters 107, as shown in FIGS. 1A and 1B, is in an antenna switch module, for connecting different signal paths to an antenna.

However, particularly when bandpass filters 107 are connected to the switch module 100, in some cases signals passing through the active signal path can couple with the other signal paths. Specifically, as series switches 105 present like capacitors as illustrated in FIG. 1B (e.g., capacitor 105a'), radio-frequency signals in the active signal path can couple with these capacitors on the non-active signal paths of the switch module 100. Whilst usually the coupling between a radio-frequency signal passing through the active signal path with the non-active signal paths will be relatively weak, in some cases a resonance may occur leading to very large losses, known as "suck-out".

Figure 3A:
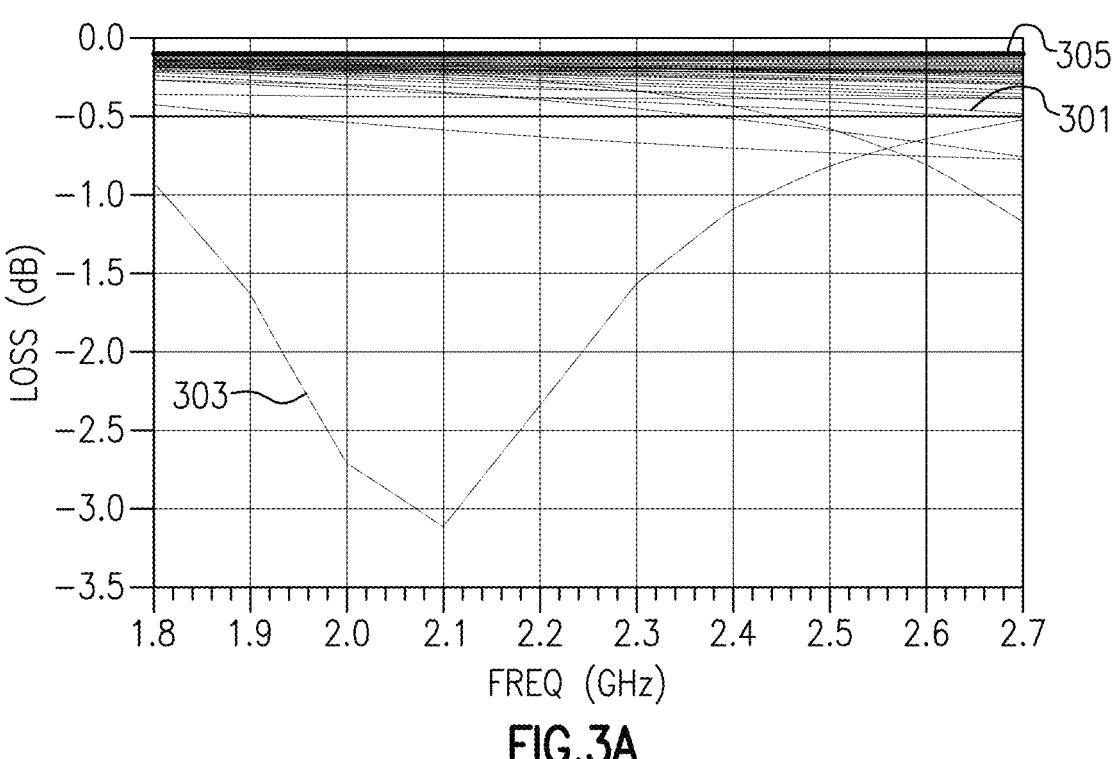
FIGS. 3A and 3B are a comparison of the switch module of FIGS. 1A and 1B and the switch module of FIGS. 2A-2C.

FIG. 3A illustrates representative losses due to the coupling between the active and non-active signal paths in the switch module of FIG. 1A. Each line represents the losses due to coupling with a non-active signal path and corresponds to a given load at the non-active input node. The different lines represent the load be swept across different values. As can be seen, whilst most coupling is weak resulting in low losses (typically less than 0.5 dB), as per lines 301, in some instances resonance occurs. This is illustrated by line 303, showing losses of over 3 dB for a radio-frequency signal of 2.1 GHz. In fact, the peak of the resonance lies between 2.0 and 2.1 GHz and will have losses far greater than 3 dB, but the frequency resolution of the plot does not show this.

This resonant behavior, i.e., suck-out, can be prevented through the use of shunt switches that can selectively connect and disconnect the signal paths to ground. A switch module 200 comprising such shunt switches 209 is illustrated in FIG. 2A.

As with switch module 100 of FIG. 1A, switch module 200 comprises a plurality of second (e.g., input) nodes 201 and a first (e.g., output) node 203, and a signal path is defined between each input node 201 and the output node 203, with a series switch 205 disposed on each signal path between the input node 201 and the output node 203. Like for switch module 100, switch module 200 connects an input node 201, e.g., input node 201b, to the output node 203 by setting the respective series switch, e.g., series switch 205b, to a closed state. This defines the active signal path. The series switches 205 not on the active signal path, such as series switch 205a, remain in an open state such that their respective input nodes 201, e.g., input node 201a, remain disconnected from the output node 203. The switch module is also configured to be connected, at the input nodes 201, to a plurality of bandpass filters 207.

Unlike switch module 100, however, switch module 200 comprises a plurality of shunt switches 209. Each shunt switch 209 selectively connects a signal path to ground, depending upon whether the shunt switch 209 is in an open state (the signal path is disconnected from ground, e.g., shunt switch 209b) or in a closed stated (the signal path is connected to ground, e.g., shunt switch 209a).

Figure 2B:
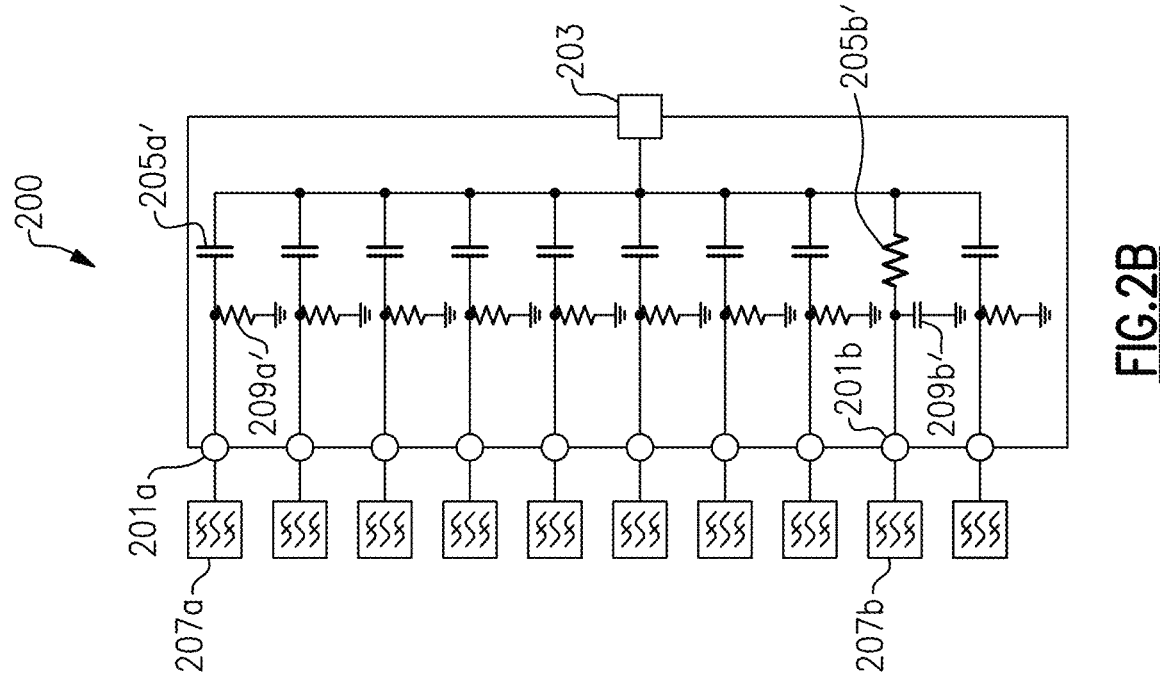
FIGS. 2A-2C illustrate a switch module according to aspects.
Figure 2A:
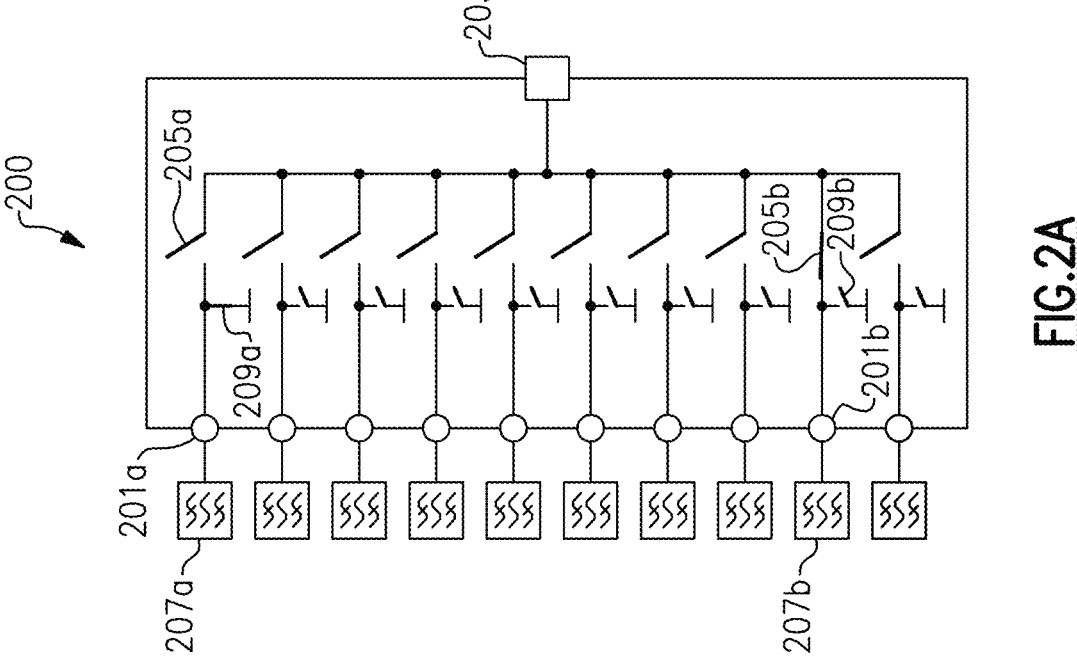

As illustrated in FIG. 2A, the shunt switches 209 are connected to the signal paths between the input nodes 201 and the series switches 205. Also as illustrated in FIG. 2A, a shunt switch 209 is provided on each signal path. However, this need not be the case, and some signal paths may not be provided with a shunt switch 209.

FIG. 2B shows a representation of the switch module 200 of FIG. 2A whereby the series switches 205 and shunt switches 209 are shown as the corresponding capacitors (for open switches) or resistors (for closed switches) that are the electrical equivalents. Similarly to FIG. 1B, the open series switches 205, such as series switch 205a, present a capacitance, represented for example by capacitor 205a', and the closed series switches 205, such as series switch 205b, present a resistance, represented for example by resistor 205b'. The same is true for the shunt switches 209, whereby open shunt switches 209, such as shunt switch 209b, present a capacitance, represented for example by capacitor 209b', and the closed shunt switches 209, such as shunt switch 209a, present a resistance, represented for example by resistor 209a'.

The shunt switches 209 of switch module 200 are configured to be in an open state when the signal path that the shunt switch 209 is connected to is the active signal path. That is, on the signal path where the series switch 205 is in a closed state (e.g., series switch 205b), the shunt switch 209 (e.g., shunt switch 209b) is in an open state to prevent the radio-frequency signal passing along the active signal path from grounding. However, on non-active signal paths, the shunt switches 209 may be in an open or a closed state. For example, shunt switch 209a is in a closed state, as are the remainder of the shunt switches 209. In particular, shunt switches 209 that are not on the active signal path should be in a closed state if the radio-frequency signal passing through the active signal path would resonate with the corresponding series switch 205. For example, if a radio-frequency signal in the passband of bandpass filter 207a, connected to the input node 201a of the inactive signal path by virtue of series switch 205a being in a open state, would resonate with the equivalent capacitor 205a' presented by series switch 205a at the same frequency of the bandpass filter 207b connected to the active path, then the shunt switch 209 on the same signal path as series switch 205a, that is, shunt switch 209a, should be in a closed state.

Figure 2C:
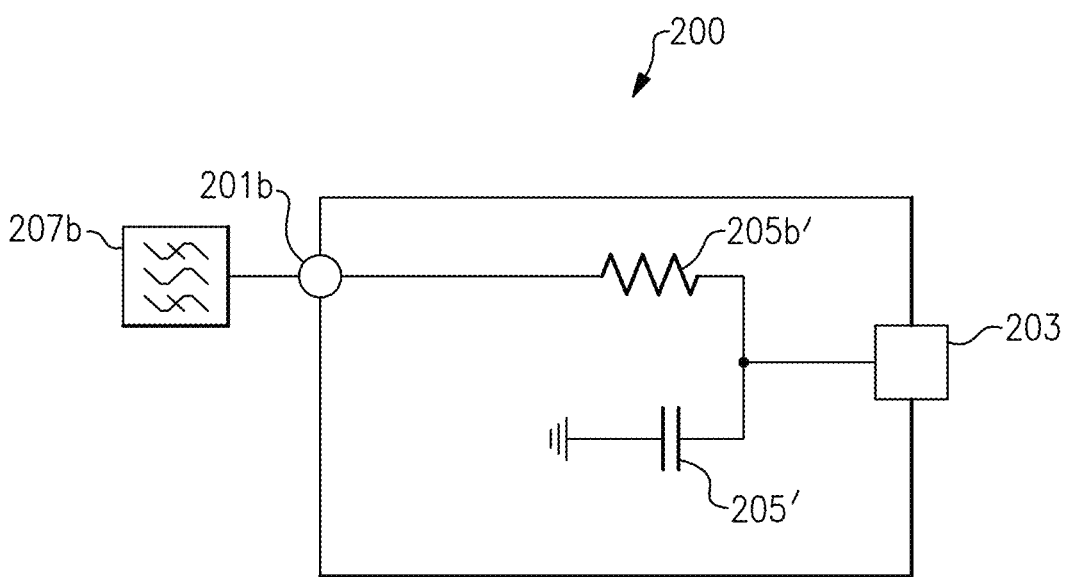

If all of the shunt switches 209 that are not on the active signal path are in a closed state, as is the case in FIGS. 2A and 2B, then the equivalent circuit shown in FIG. 2B can be simplified. The simplified equivalent circuit of the switch module 200 is shown in FIG. 2C. In FIG. 2C, switch module 200 is illustrated as having an active signal path from input node 201b to output node 203 comprising resistor 205b' (corresponding to a closed series switch 205). The other, non-active, signal paths can all be represented by a single grounded capacitor 205'. This is because, as will be appreciated by studying FIGS. 2A and 2B, the non-active signal paths are equivalent to a plurality of capacitors connected in parallel to ground. Therefore, they can be replaced by an equivalent single grounded capacitor 205' having a capacitance that is the sum of the capacitors presented by the open switches 205 on the non-active signal paths. One advantage of such an implementation, whereby each signal path comprises a shunt switch 209 and whereby the shunt switches 209 on each non-active signal path are in a closed state, is that the equivalent circuit shown in FIG. 2C is very simple and has well-known properties.

Figure 3B:
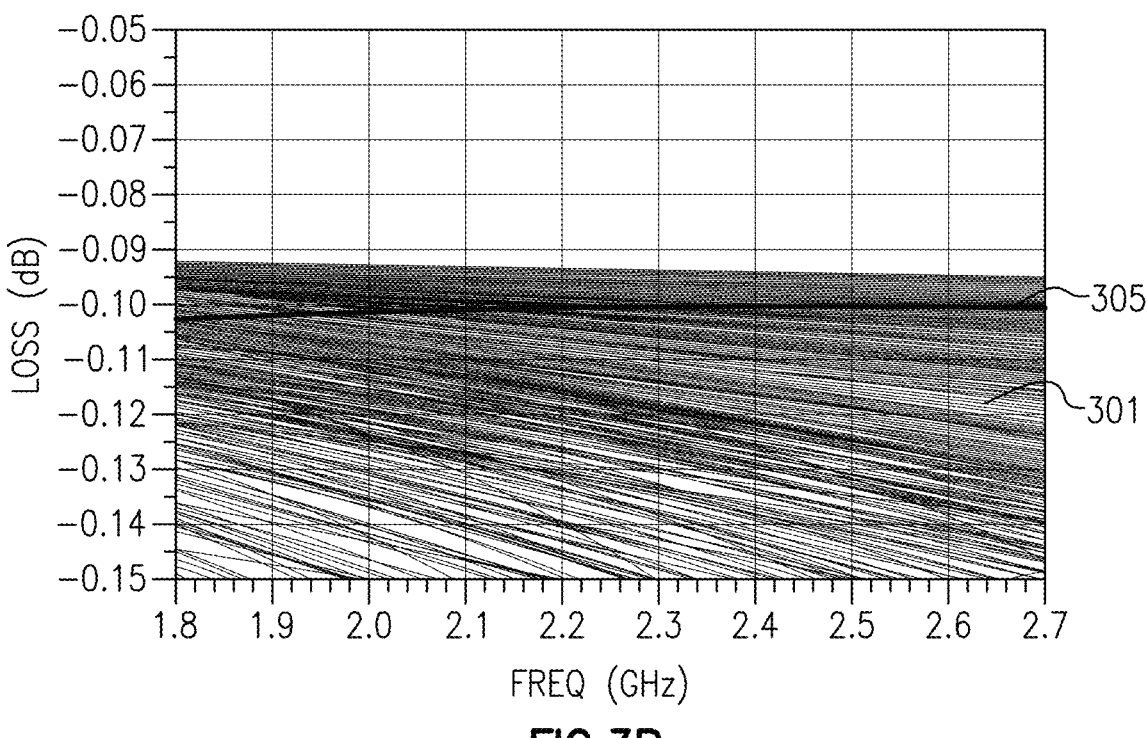

Returning to FIG. 3A, the losses associated with the switch module 200 are illustrated by line 305. As can be seen, the resonant behavior illustrated by line 303 is not present in line 305, showing that the suck-out problem is not present in switch module 200 because the shunt switches 209 keep the impedance presented by the series switches 205 constant, and so the non-active signal paths have a single response independent of the load presented by the bandpass filters 207 as the signal paths are connected to ground. Additionally, the losses of switch module 200 compared to switch module 100 are generally lower, as can be seen by comparing line 305 with lines 301. However, there is some additional parasitic capacitance due to the series switch 205 capacitances being shorted to ground, which explains why the loss of switch module 200 is not as low as the smallest losses of switch module 100, as seen in FIG. 3B, which shows a view of the top of FIG. 3A having an exaggerated y-axis.

In order to minimize this additional loss due to the shunt switches 209, not every non-active signal path need have its shunt switch 209 closed. For a given non-active signal path, it can be determined whether the insertion loss is lower with the shunt switch 209 in a closed or an open state. FIGS. 4A to 4C show a comparison of the loss with a shunt switch 209 in an open state and in a closed state, for three different radio-frequency signal frequencies. FIG. 4A shows the case for a 1.8 GHz radio-frequency signal, FIG. 4B shows the case for a 2.2 GHz radio-frequency signal, and FIG. 4C shows the case for a 2.7 GHz radio-frequency signal.

The difference in the loss between having the shunt switch 209 in and open and a closed state is shown by the contours

401, with contour 401*b* plotting the line of zero difference (i.e., the loss is the same with and without the shunt switch 209 open). The area outside of this contour 401*b*, area 403, including contour 401*a*, therefore represents the area where the loss is lower with the shunt switch 209 in an open state (or equivalently, without a shunt switch 209). The area inside contour 401*b*, area 405, including contour 401*c*, represents the area where the loss is lower with the shunt switch 209 in a closed state.

Each point 407 represents an impedance that can be presented by a bandpass filter 207 of the non-active signal path). The real component of the impedance is represented along the central horizontal axis, with an impedance of 50Ω in the center, 0Ω (i.e., a short circuit) on the leftmost end, and ∞Ω (i.e., an open circuit) on the rightmost end of the central horizontal axis. The imaginary component of the impedance is represented vertically, with a positive reactance (i.e., an inductive regime) in the northern hemisphere (above the horizontal central axis) and a negative reactance (i.e., a capacitive regime) in the southern hemisphere (below the horizontal central axis).

Such a plot can be made for each signal path, and then the impedances of each of the other signal paths can be plotted to determine if each of those other signal paths should have a shunt switch 209 in an open state or a closed state, based upon whether the impedance of that signal path is outside or inside of contour 401*b*.

Comparing different frequency radio-frequency signals, by comparing FIGS. 4A, 4B and 4C, it can be seen that contour 401*b* is larger (i.e., encloses more area) for higher frequency radio-frequency signals (i.e., FIG. 4C) than for lower frequency radio-frequency signals (i.e., FIG. 4A). This means that at lower frequencies, the shunt switch 209 is needed less of the time and at higher frequencies. This is because, as the impedance of the capacitors 205*a'* presented by open shunt switches 205*a* is inversely proportional to the frequency of the radio-frequency signal, at lower frequencies the effective impedance of the capacitors 205*a'* is relatively high, whereas at higher frequencies it is lower. It can also be seen, by comparing FIGS. 4A, 4B and 4C, that the risk of suck-out increases at higher frequencies if a shunt switch 209 is not used. This is seen by the increase in area 409 enclosed by the smallest contour. This represents an area where the loss in the case of not having a shunt switch 209 is becoming greater and greater that the loss in the case of having a shunt switch 209, due to the resonant effect discussed above. The contours of FIGS. 4A-4C only represent a finite difference between the losses in each case, and so the increase in area 409 represents an increased area where the difference between the losses in each case is the same or greater than this maximum contour value.

Figure 5:
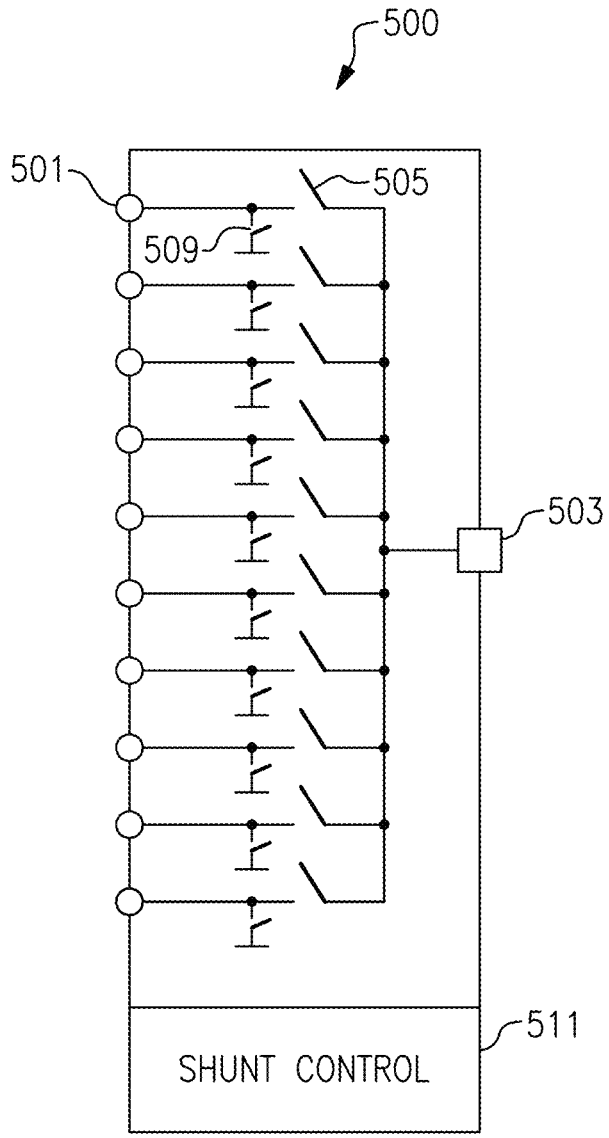
FIG. 5 is a switch module according to aspects.

As illustrated by FIGS. 4A-4C, in some cases it is advantageous to have a shunt switch on a signal path, but in other cases it is preferable to not have a shunt switch on a signal path (or to leave it open, even when the signal path is a non-active signal path). FIG. 5 shows an exemplary switch module 500 comprising a shunt control module 511 which controls the shunt switches 509 to minimize losses in accordance with the principles discussed above.

As with switch module 200 in FIGS. 2A-2C, switch module 500 comprises a plurality of input nodes 501 and an output node 503, with a signal path being defined between each input node 501 and the output node 503. A series switch 505 is disposed on each signal path and is operable to selectively connect or disconnect the corresponding input node 501 to the output node 503. A shunt switch 509 is also disposed on each signal path operable to connect the signal path to ground. The input nodes 501 are each connectable to a bandpass filter (not shown).

The shunt control module 511 is configured to set the shunt switches 509 in a closed or an opens state depending upon the frequency of the radio-frequency signal passing through the active signal path (or upon the passband of the bandpass filter connected to the input of the active signal path, which will restrict the range of frequencies that the radio-frequency signal may have) and upon the impedances of each of the non-active signal paths to minimize the losses in the switch module 500 and ensure that suck-out is avoided.

Figure 6A:
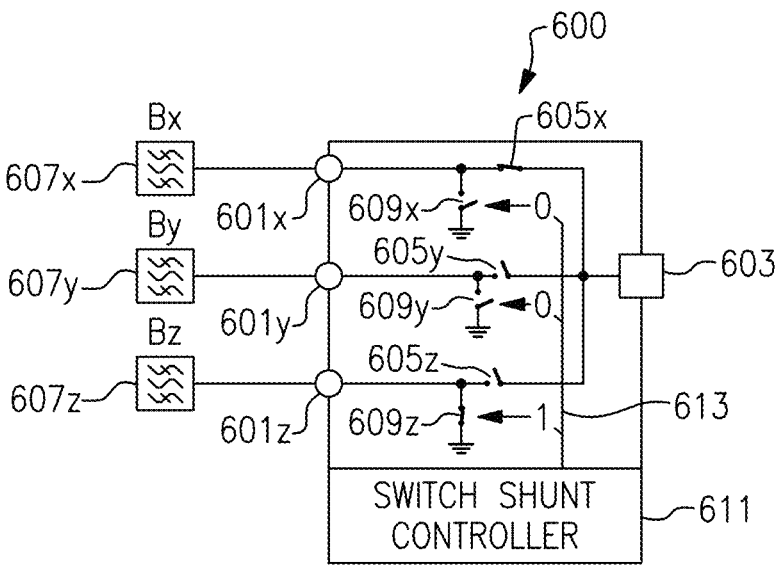
FIGS. 6A and 6B illustrate a switch module according to aspects.
Figure 6B:
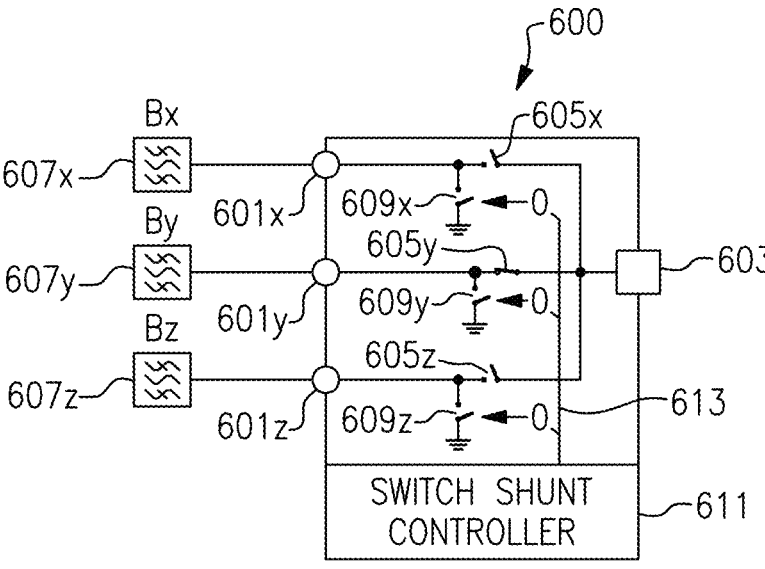
Figure 7:
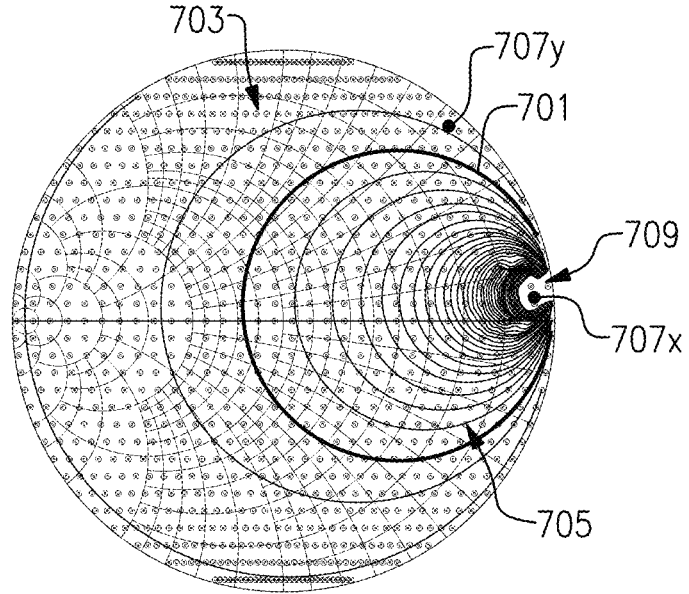
FIG. 7 illustrates the effect of shunt switches being open and closed in the switch module of FIGS. 6A and 6B.

FIGS. 6A, 6B and 7 illustrate an example with three signal paths that shows this principle in operation. FIGS. 6A and 6B show a switch module 600. The switch module 600 is generally the same as switch module 500 of FIG. 5 except that only three signal paths (x, y and z) are provided in switch module 600 compared to the ten signal paths in switch module 500. Switch module 600 comprises three input nodes 601 connected to an output node 603 defining the three signal paths. Series switches 605 are disposed on each signal path, along with shunt switches 609. Each input node 601 is connected to a bandpass filter 607, and the shunt switches 609 are controlled by shunt switch controller 611.

The components on each of the three signal paths are identified with the letters x, y and z after the reference numeral, and the signal paths themselves are referred to as signal path x, signal path y and signal path z. That is to say, signal path x is defined from input node 601*x* to output node 603, comprises series switch 605*x* and shunt switch 609*x*, and has bandpass filter 607*x* connected to input node 601*x*. Similarly, signal path y is defined from input node 601*y* to output node 603, comprises series switch 605*y* and shunt switch 609*y*, and has bandpass filter 607*y* connected to input node 601*y*; and signal path z is defined from input node 601*z* to output node 603, comprises series switch 605*z* and shunt switch 609*z*, and has bandpass filter 607*z* connected to input node 601*z*.

FIG. 6A illustrates the case wherein signal path x is the active signal path. This is because series switch 605*x* is in a closed state, connected input node 601*x* to output node 603, whilst series switch 605*y* and series switch 605*z*, on signal path y and signal path z respectively, are in an open state, disconnecting input node 601*y* and input node 601*z* from output node 603. Because signal path x is the active signal path, shunt switch 609*x* is in an open state. However, the shunt switch 609*y* and shunt switch 609*z* may be in an open state or a closed state, and, as discussed above, whether they should be in an open or a closed state depends on the frequency of the radio-frequency signal passing through the active signal path and on the impedance presented by non-active signal paths x and y.

FIG. 6B illustrates the case wherein signal path y is the active signal path. In this case, series switch 605*x* and series switch 605*z* are both in an open state, whilst series switch 605*y* is in a closed state. Shunt switch 609*y* must be in an open state, but shunt switches 609*x* and 609*z* may be in an open or closed state so as to minimize losses.

Considering shunt switch 609*z*, FIG. 7 shows a plot for determining whether it should be in a closed state or an open state in the cases illustrated in FIGS. 6A and 6B (i.e., when signal path x is the active signal path and when signal path y is the active signal path). FIG. 7 is the same type of plot as in FIGS. 4A to 4C, and details of the plot discussed in relation to these FIGS. Will not be repeated where they are the same.

In FIG. 7, contour 701 represents the boundary where the loss when a shunt switch is open and the loss when a shunt switch is closed are equal. The area outside of this contour 701, area 703, is the region where the loss is lower with the shunt switch in an open state, whereas the area inside of contour 701, area 705, is the region where the loss is lower with the shunt switch in a closed state.

The impedance presented by bandpass filter 607z connected to path z can be plotted for both the case when signal path x is the active signal path and where signal path y is the active signal path. Point 707x represents the impedance of signal path z when signal path x is the active signal path, and point 707y represents the impedance of signal path z when signal path y is the active signal path. It can be seen that point 707x is within contour 701, and so it is preferable to have shunt switch 609z in a closed state when signal path x is the active signal path. This is reflected in FIG. 6A, wherein shunt switch 609z is illustrated in a closed state. In fact, point 707x is within region 709 whereby some level of resonance could occur leading to a large amount of suck-out were shunt switch 609z left in an open state when signal path x is the active signal path. Accordingly, it is particularly advantageous to have shunt switch 609z in a closed state in this case.

On the other hand, point 707y is outside of contour 701. Therefore, it can be concluded that the losses are lower when shunt switch 609z is in an open state when signal path y is the active signal path. This is reflected in FIG. 6B, which shows shunt switch 609z in an open state. A similar analysis can be performed for shunt switch 609x when signal paths y and z are the active signal paths, and for shunt switch 609y when signal paths x and z are the active signal paths. The results of this analysis (i.e., whether a shunt switch 609 should be in an open state or a closed state when a given signal path is the active signal path) can be stored in memory, for example, in the shunt switch controlled 611. The shunt switch controller 611 can then open and close the appropriate shunt switches 609 for the current active signal path, via a control signal 611, to minimize the losses of the switch module 600.

It will be appreciated that if this analysis reveals that on a given signal path, the shunt switch 609 should never be in a closed state (i.e., the losses are lower for each active signal path with the shunt switch 609 in an open state), then a shunt switch 609 need not be included on that signal path. This simplifies the manufacture of the switch module 600 as well as reducing its size. In this way, only shunt switches 609 that are needed are included in switch module 600.

The shunt switch controller 611 may be integral with or separate from the switch module 600, and may be its own dedicated controller or a part of another controller having other functions. For example, in the case where the switch module 600 is an antenna switch module, the shunt switch controller 611 may be integrated with an antenna switch module controller, which may also control the series switches 605. In some cases, which shunt switches 609 should be in an open state and which should be in a closed state, for each possible active signal path, are determined before or during manufacture and the shunt switch controller 611 is programmed accordingly as part of the manufacturing process. This is advantageous as it means that a later user of the switch module 600 will not have to adapt their processes to account for the new switch module 600 comprising shunt switches 609.

Figure 8:
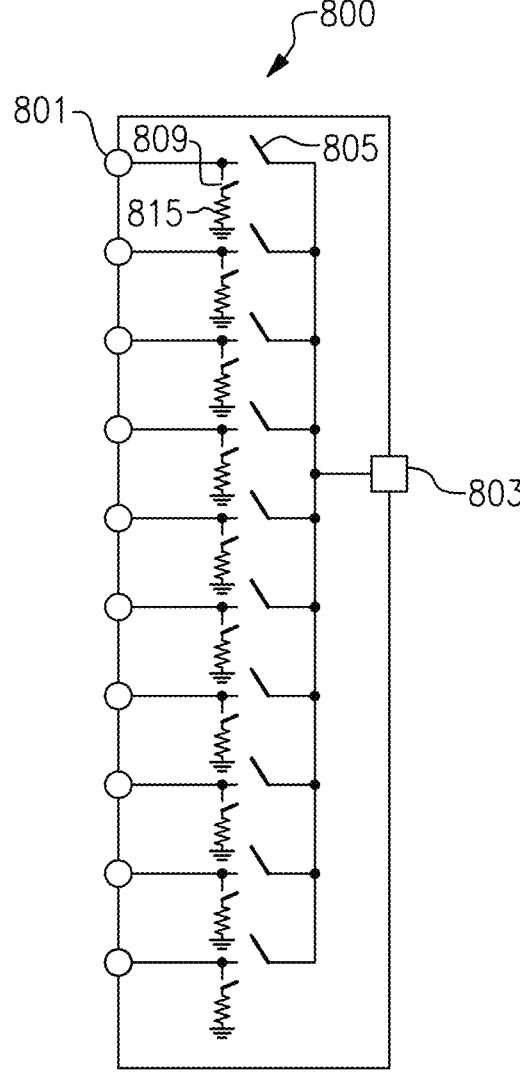
FIG. 8 is a switch module according to aspects.

FIG. 8 shows another switch module 800, similar to the switch modules 300, 500, 600 of FIGS. 3, 5 and 6. Switch module 800 comprises a plurality of input nodes 801 (which may be connected to bandpass filters, not shown) and an output node 803 which define a plurality of signal paths. As with the switch modules of FIGS. 3, 5 and 6, each signal path of switch module 800 comprises a series witch 805 operable to selectively connect and disconnect the input node 801 of the signal path with the output node 803, and each signal path also comprises a shunt switch 809 which selectively connects the signal path to ground (though, as discussed above, not every signal path may need such a shunt switch 809). In addition, however, switch module 800 comprises a plurality of shunt resistors 815 arranged in series with the shunt switches 809, between the shunt switches 809 and ground. That is, each signal path comprises a shunt switch 809 and a shunt resistor 815, connected in series with the shunt switch 809 between the shunt switch 809 and ground.

Figure 9A:
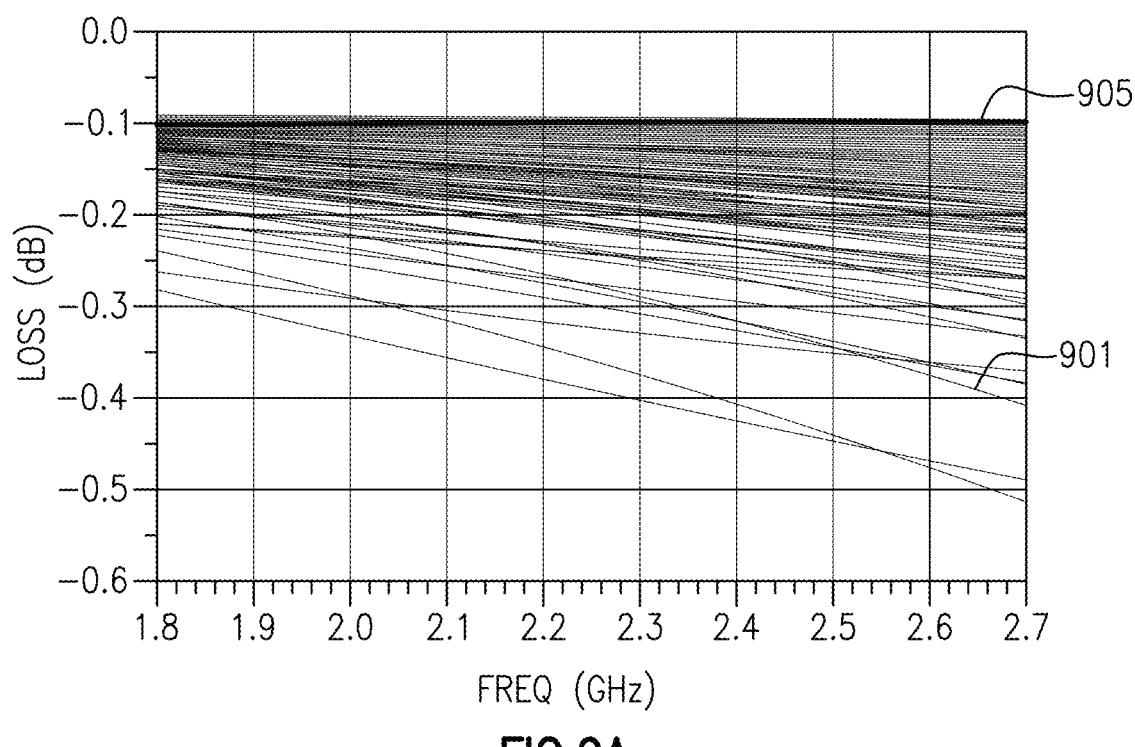
FIGS. 9A and 9B illustrate the effect of the shunt resistors in the switch module of FIG. 8.
Figure 9B:
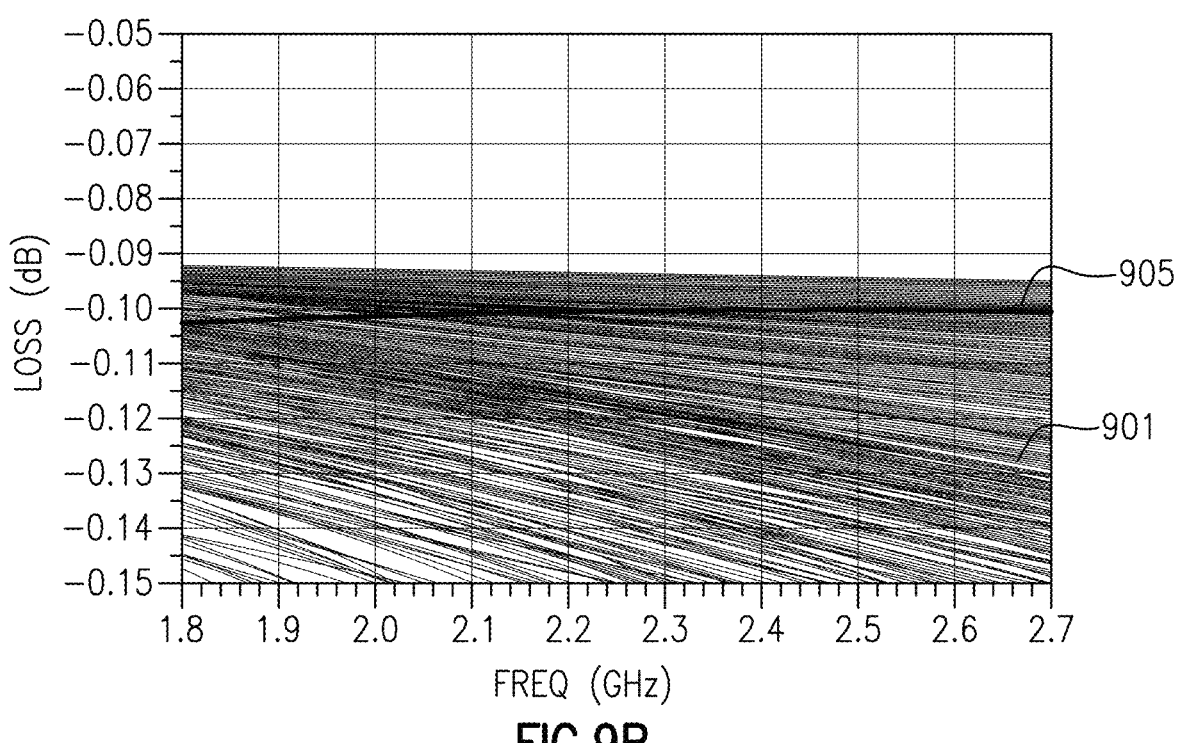

The inclusion of the shunt resistors can further reduce suck-out and losses in the switch module 800. This is illustrated in FIGS. 9A and 9B. The graphs in FIGS. 9A and 9B are equivalent to the graphs of FIGS. 3A and 3B, except that they relate to the switch module 800 of FIG. 8. Lines 901 in FIG. 9A show that, even without opening any of shunt switches 809, the inclusion of the shunt resistors 915 eliminates the worst resonant effects that give rise to the large suck-out shown by line 303 in FIG. 3A.

Figures 10A, 10B, 10C:
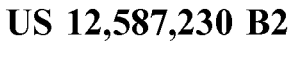
FIGS. 10A-10C illustrate the effect of the shunt resistors in the switch module of FIG. 8

This effect of the shunt resistors 815 can be seen by looking at FIGS. 10A-10C, and by comparing these FIGS. to FIGS. 4A-4C. FIGS. 10A-10C plot the contours of the difference in the loss with the shunt switches 809 open and closed for switch module 800. Similarly to FIGS. 4A-4C, in FIGS. 10A-10C contour 1001b plots the line of zero difference (i.e., the loss is the same with and without the shunt switch 809 open). The area outside of this contour 1001b, area 1003, including contour 1001a, represents the area where the loss is lower with the shunt switch 809 in an open state (or equivalently, without a shunt switch 809). The area inside contour 1001b, area 1005, including contour 1001c, represents the area where the loss is lower with the shunt switch 809 in a closed state. Comparing the plots in FIGS. 10A-10C with those of FIGS. 4A-4C, i.e., comparing the effect of having the shunt resistors 815 or not, shows this reduction in suck-out. This can be seen due to the decrease in size (or even absence, as in FIG. 10A) of the area where resonant effects lead to large suck-out in FIGS. 4A-4C (i.e., areas 409) compared to in FIGS. 10A-10C (i.e., areas 1009).

Figure 11:
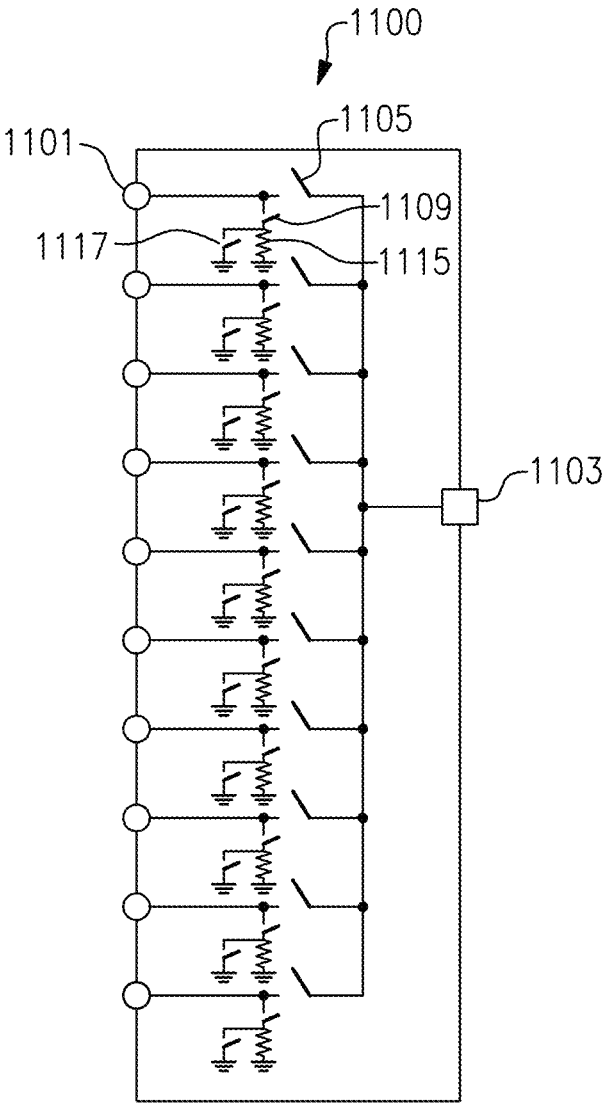
FIG. 11 is a switch module according to aspects.

FIG. 11 illustrates yet another switch module 1100. Switch module 1100 is the same as switch module 800 of FIG. 8, except that switch module 1100 comprises a plurality of bypass switches 1117. That is, switch module 1100 comprises a plurality of input nodes 1101 and an output node 1103 defining a plurality of signal paths. A series switch 1105 is defined on each signal path between the input nodes 1101 and the output node 1103, and a shunt arm, comprising a shunt switch 1109 and a shunt resistor 1115, is also connected between each signal path and ground.

The bypass switches 1117 are provided in parallel to the shunt resistors 1115. That is, for a given signal path, they are connected between the shunt switch 1109 and the shunt resistor 1115 and to ground. The bypass switch 1117 may be preferable at low frequencies when the shunt resistor 1115 is not needed, and instead it is preferable to connect the signal path straight to ground.

Figure 12:
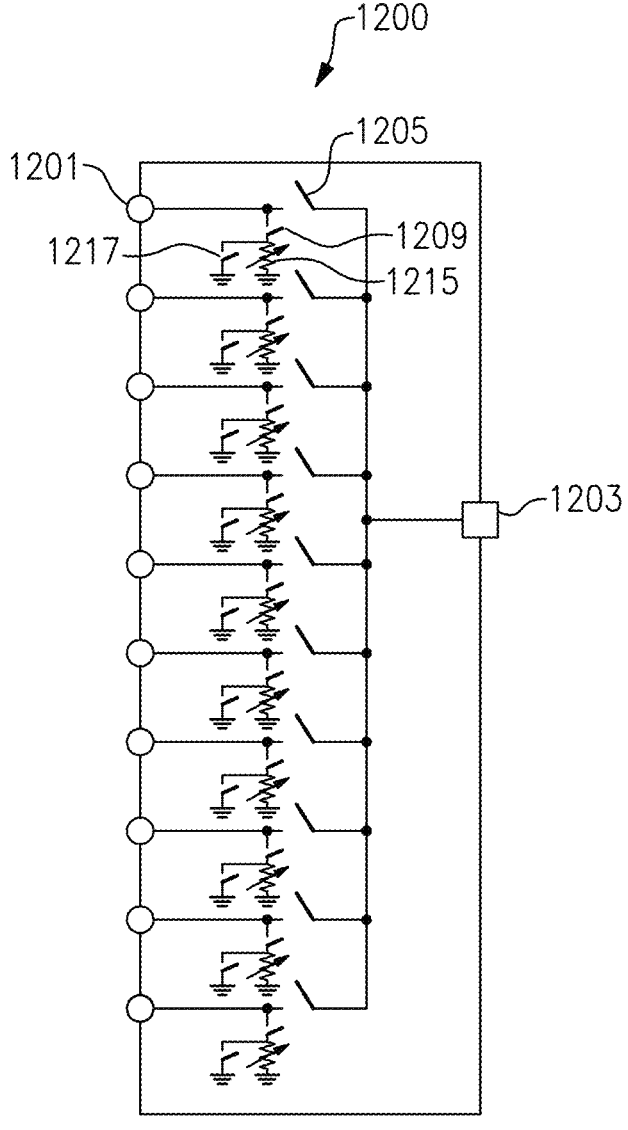
FIG. 12 is a switch module according to aspects.

In some cases, the shunt resistors 1115 may be variable resistors. FIG. 12 illustrates a switch module 1200 having variable shunt resistors 1215. In all other respects, switch module 1200 is identical to switch module 1100 of FIG. 11, and comprises a plurality of input nodes 1201 and an output node 1203 defining a plurality of signal paths. A series switch 1205 is located on each signal path between the input node 1201 and the output node 1203. A shunt arm, comprising a shunt switch 1209, a shunt resistor 1215, and a bypass switch 1217 is also connected between each signal path and ground. It will be appreciated that other switch modules having shunt resistors, not just those that also comprise a bypass switch (e.g., switch module 800 of FIG. 8), can utilize variable resistors as the shunt resistors. The variable resistors may also be implemented in any suitable format that provides the desired resistances. For example, a bank of discreet resistors may be provided which can be connected in combinations of series and parallel resistors to provide the desired overall resistance.

Figure 13:
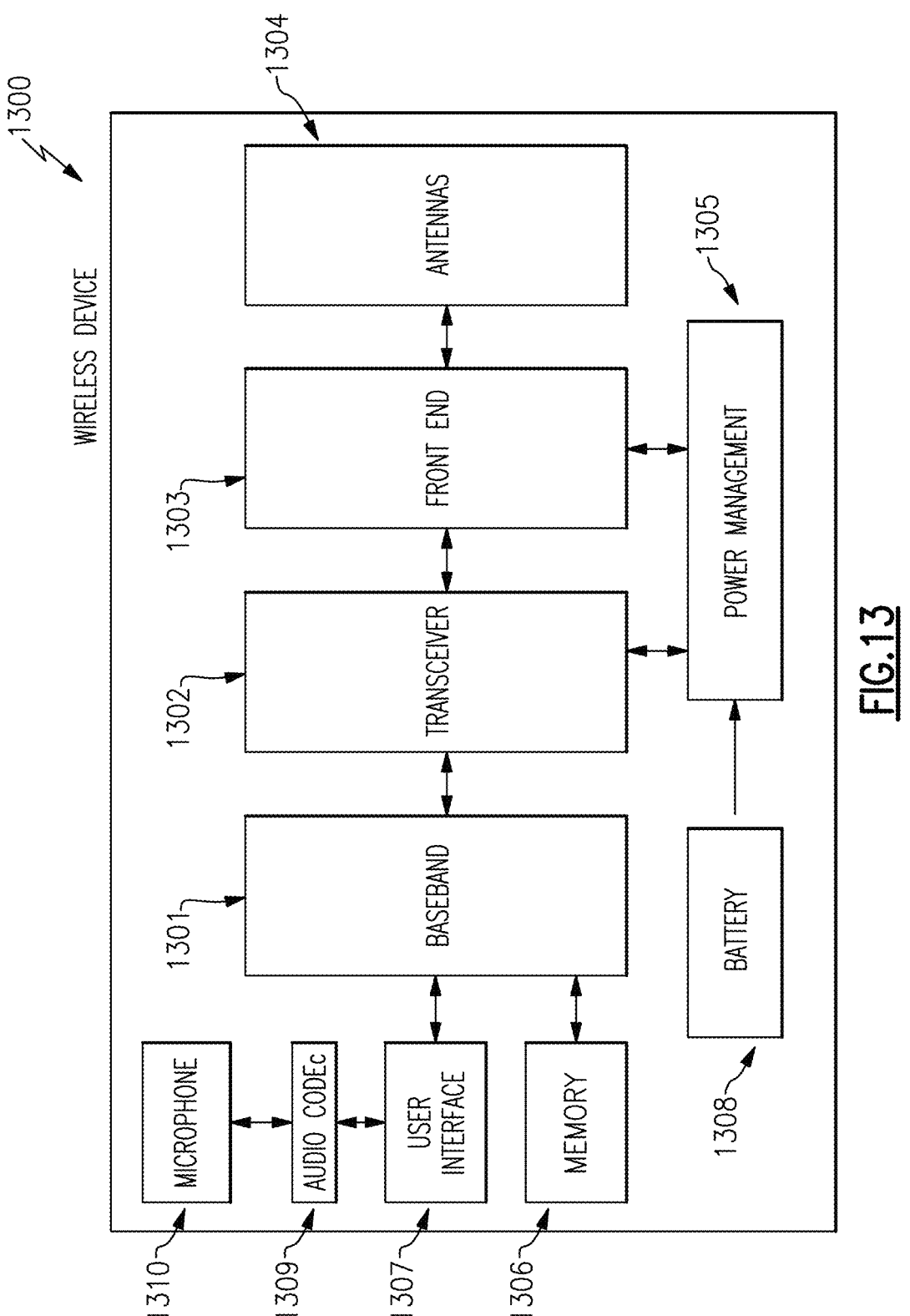
FIG. 13 is a wireless device according to aspects.

FIG. 13 is a schematic diagram of a wireless device 1300 according to certain embodiments. The wireless device 1300 can be, for example but not limited to, a wireless access point, such as a router, or a portable telecommunication device, such as a mobile cellular-type telephone. The wireless device 1300 can include a microphone arrangement 1300, and may include one or more of a baseband system 1301, a transceiver 1302, a front end system 1303, one or more antennae 1304, a power management system 1305, a memory 1306, a user interface 1307, a battery 1308, and audio codec 1309. The microphone arrangement may supply signals to the audio codec 1309 which may encode analog audio as digital signals or decode digital signals to analog. The audio codec 1309 may transmit the signals to a user interface 1307. The user interface 1307 transmits signals to the baseband system 1301. The transceiver 1302 generates RF signals for transmission and processes incoming RF signals received from the antennae. The front end system 1303 aids in conditioning signals transmitted to and/or received from the antennae 1304. The antennae 1304 can include antennae used for a wide variety of types of communications. For example, the antennae 1304 can include antennae 1304 for transmitting and/or receiving signals associated with a wide variety of frequencies and communications standards. The baseband system 1301 is coupled to the user interface to facilitate processing of various user input and output, such as voice and data. The baseband system 1301 provides the transceiver 1302 with digital representations of transmit signals, which the transceiver 1302 processes to generate RF signals for transmission. The baseband system 1301 also processes digital representations of received signals provided by the transceiver 1302.

As shown in FIG. 13, the baseband system 1301 is coupled to the memory 1306 to facilitate operation of the wireless device 1300. The memory 1306 can be used for a wide variety of purposes, such as storing data and/or instructions to facilitate the operation of the wireless device 1300 and/or to provide storage of user information. The power management system 1305 provides a number of power management functions of the wireless device 1300. The power management system 1305 receives a battery voltage from the battery 1308. The battery 1308 can be any suitable battery for use in the wireless device, including, for example, a lithium-ion battery. In other cases, however, the battery 1308 may instead be replaced by a mains electricity connection.

The switch modules described herein may be incorporated into the wireless device 1300 of FIG. 13, and in particular may be used as an antenna switch module (ASM) in the front end system 1303. The ASM can select the desired antenna from antennae 1304.

While many of the switch modules described herein have been illustrated or taught as having their input nodes connected to a plurality of bandpass filters, this should not be considered as limiting and it is anticipated that other components could be connected to the input nodes in addition to, or instead of, the plurality of bandpass filters. For example, in one example, a plurality of multiplexers may be connected to the input nodes.

Furthermore, while the ports of the switch modules described herein have been described as input nodes and output nodes, it will be appreciated that in each embodiment the reverse may be true and that the nodes referred to as input nodes are output nodes and that the nodes referred to as output nodes are input nodes (i.e., the signal passes the other way through the switch module). Additionally, the nodes may be bidirectional nodes, and may function as both input and output nodes. For example, as will be appreciated by the skilled person, a switch module may be a part of both the transmit and receive pathways of a radio-frequency module, and in such cases the nodes may be bidirectional.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the inventions described herein. Accordingly, the foregoing description and drawings are by way of example only, and the scope of the inventions should be determined from proper construction of the appended claims, and their equivalents.

the invention claimed is:

1. A radio frequency antenna switch module comprising:
first port;
a plurality of second ports;
a plurality of series switches;
a plurality of signal paths, each signal path defined between one of the plurality of second ports and the first port and having one of the plurality of series switches disposed therebetween;
one or more shunt switches coupled between at least one of the plurality of signal paths and ground; and
a control circuit configured to control opening and closing of the one or more shunt switches to open any shunt switch of one or more shunt switches that is connected to an active signal path, and to, based on preset logic, selectively close shunt switches of the one or more shunt switches connected to inactive signal paths.

2. The radio frequency antenna switch module of claim 1 wherein each signal path has at least one shunt switch of the one or more shunt switches coupled between that signal path and ground, and the control circuit is configured to open the shunt switch corresponding to an active signal path of the plurality of signal paths.

3. The radio frequency antenna switch module of claim 1 further comprising one or more shunt resistors connected in series with the one or more shunt switches.

4. The radio frequency antenna switch module of claim 3 wherein the one or more shunt resistors are connected between the one or more shunt switches and ground.

5. The radio frequency antenna switch module of claim 3 further comprising one or more bypass switches connected to ground in parallel with one of the one or more shunt resistors.

6. The radio frequency antenna switch module of claim 3 wherein the one or more shunt resistors are variable resistors or programmable resistors.

7. The radio frequency antenna switch module of claim 1 wherein the antenna switch module is incorporated into a radio frequency front end.

8. The radio frequency antenna switch module of claim 1 further comprising a plurality of bandpass filters wherein each second port of the plurality of second ports is configured to be connected to a bandpass filter having an associated passband.

9. The radio frequency antenna switch module of claim 8 wherein the preset logic is based upon a determination, for each shunt switch of the one or more shunt switches connected to inactive signal paths, of whether loss to a signal passing through one of the one or more active signal paths is greater in the case of the shunt switch being open or closed.

10. The radio frequency antenna switch module of claim 9 wherein the preset logic is configured to minimize the loss to the signal passing through one of the one or more active signal paths.

11. The radio frequency antenna switch module of claim 9 wherein the determination is based at least in part on passbands of the bandpass filter each second port is configured to be connected to.

12. The radio frequency antenna switch module of claim 8 further comprising a plurality of bandpass filters connected to the plurality of second ports such that each signal path includes a bandpass filter.

13. A radio-frequency front end module comprising an antenna switch module, the antenna switch module having:
   a first port; a plurality of second ports; a plurality of series switches; a plurality of signal paths, each signal path defined between one of the plurality of second ports and the first port and having one of the plurality of series switches disposed therebetween; one or more shunt switches coupled between at least one of the plurality of signal paths and ground; and a control circuit configured to control opening and closing of the one or more shunt switches to open any shunt switch of one or more shunt switches that is connected to an active signal path, and to, based on preset logic, selectively close shunt switches of the one or more shunt switches connected to inactive signal paths.

14. The radio-frequency front end module of claim 13 wherein the preset logic is based upon a determination, for each shunt switch of the one or more shunt switches connected to inactive signal paths, of whether loss to a signal passing through one of the one or more active signal paths is greater in the case of the shunt switch being open or closed.

15. A wireless device comprising:
   an antenna switch module including a first port; a plurality of second ports; a plurality of series switches; a plurality of signal paths, each signal path defined between one of the plurality of second ports and the first port and having one of the plurality of series switches disposed therebetween; one or more shunt switches coupled between at least one of the plurality of signal paths and ground; and a control circuit configured to control opening and closing of the one or more shunt switches to open any shunt switch of one or more shunt switches that is connected to an active signal path, and to, based on preset logic, selectively close shunt switches of the one or more shunt switches connected to inactive signal paths.

16. The wireless device of claim 15 further comprising a radio-frequency front end module, wherein the antenna switch module is disposed within the radio-frequency front end module.

17. The wireless device of claim 16 wherein the preset logic is based upon a determination, for each shunt switch of the one or more shunt switches connected to inactive signal paths, of whether loss to a signal passing through one of the one or more active signal paths is greater in the case of the shunt switch being open or closed.

18. The radio-frequency front end module of claim 13 wherein the preset logic is configured to minimize loss to the signal passing through one of the one or more active signal paths.

19. The wireless device of claim 15 wherein the preset logic is configured to minimize loss to the signal passing through one of the one or more active signal paths.

\* \* \* \* \*